(12) United States Patent
Chan et al.

(10) Patent No.: US 7,379,551 B2
(45) Date of Patent: May 27, 2008

(54) METHOD AND SYSTEM FOR RECOVERING PASSWORD PROTECTED PRIVATE DATA VIA A COMMUNICATION NETWORK WITHOUT EXPOSING THE PRIVATE DATA

(75) Inventors: Kok Wai Chan, Bellevue, WA (US); Dafina Ivanova Toncheva, Redmond, WA (US); Baskaran Dharmarajan, Bellevue, WA (US); Rahul Shrikant Newaskar, Bellevue, WA (US); Adam Back, Devon (GB)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 10/816,756

(22) Filed: Apr. 2, 2004

(65) Prior Publication Data

US 2005/0223216 A1 Oct. 6, 2005

(51) Int. Cl.
*H04K 1/00* (2006.01)
*H04L 9/00* (2006.01)

(52) U.S. Cl. .................. 380/286; 707/204; 713/171

(58) Field of Classification Search ............... 380/286
See application file for complete search history.

(56) References Cited

U.S. PATENT DOCUMENTS

| | | | |
|---|---|---|---|
| 5,535,279 A | 7/1996 | Seestrom | |
| 5,812,776 A | 9/1998 | Gifford | |
| 5,937,066 A * | 8/1999 | Gennaro et al. ............ | 380/286 |
| 5,944,824 A | 8/1999 | He | |
| 5,987,232 A | 11/1999 | Tabuki | |
| 6,044,155 A * | 3/2000 | Thomlinson et al. ....... | 713/155 |
| 6,088,451 A | 7/2000 | He et al. | |
| 6,118,874 A * | 9/2000 | Okamoto et al. ........... | 380/282 |
| 6,148,404 A | 11/2000 | Yatsukawa | |
| 6,160,891 A * | 12/2000 | Al-Salqan .................... | 380/286 |
| 6,246,771 B1 | 6/2001 | Stanton et al. | |
| 6,266,421 B1 * | 7/2001 | Domyo et al. .............. | 380/286 |
| 6,363,365 B1 | 3/2002 | Kou | |
| 6,725,376 B1 | 4/2004 | Sasmazel et al. | |

(Continued)

FOREIGN PATENT DOCUMENTS

EP 0969366 A1 1/2000

(Continued)

OTHER PUBLICATIONS

Maher, "Crypto Backup and Key Escrow," Communications of the ACM, vol. 39, Issue 3, pp. 48-53, 1996.*

(Continued)

*Primary Examiner*—Matthew Heneghan
(74) *Attorney, Agent, or Firm*—Senniger Powers LLP

(57) ABSTRACT

Securely roaming private data from one client computer to another in a network. A home client application generates a first key in response to a password, and encrypts designated private data as a function of the first key. A server receives and stores the encrypted private data. A roaming client application generates the first key in response to the password, and decrypts encrypted private data transferred from the server to obtain the private data. The invention further provides users the ability to retrieve encrypted private from the server even when the user cannot remember the password associated with the first key. Also, the server has no knowledge of the private data or the keys.

21 Claims, 13 Drawing Sheets

U.S. PATENT DOCUMENTS

| | | | |
|---|---|---|---|
| 6,754,349 B1 * | 6/2004 | Arthan | 380/286 |
| 6,760,752 B1 * | 7/2004 | Liu et al. | 709/206 |
| 6,931,133 B2 * | 8/2005 | Andrews et al. | 380/286 |
| 6,981,156 B1 | 12/2005 | Stern et al. | |
| 7,203,844 B1 * | 4/2007 | Oxford | 713/193 |
| 2001/0034841 A1 | 10/2001 | Shambroom | |
| 2001/0037462 A1 | 11/2001 | Bengston | |
| 2002/0071567 A1 * | 6/2002 | Kurn et al. | 380/286 |
| 2002/0095389 A1 | 7/2002 | Gaines | |
| 2002/0112155 A1 | 8/2002 | Martherus et al. | |
| 2002/0133723 A1 | 9/2002 | Tait | |
| 2002/0150253 A1 | 10/2002 | Brezak et al. | |
| 2002/0152393 A1 | 10/2002 | Thoma et al. | |
| 2003/0093694 A1 | 5/2003 | Medvinsky et al. | |
| 2003/0149880 A1 | 8/2003 | Shamsaasef et al. | |
| 2003/0163691 A1 | 8/2003 | Johnson | |
| 2004/0228493 A1 * | 11/2004 | Ma | 380/286 |
| 2005/0074126 A1 | 4/2005 | Stanko | |

FOREIGN PATENT DOCUMENTS

| | | |
|---|---|---|
| WO | WO 01/77775 A2 | 10/2001 |
| WO | WO 02/33884 A2 | 4/2002 |

OTHER PUBLICATIONS

Boneh, Dan et al., "Efficient Generation of Shared RSA Keys", *Journal of the ACM*, Jul. 2001, pp. 702-722, vol. 48, Issue 4, ACM Press, New York, NY.

Eschenauer, Laurent et al., "A Key—Management Scheme for Distributed Sensor Networks", Proceedings of the 9th ACM Conference on Computer and Communications Security, Session: Key Management and Key Exchange, 2002, pp. 41-47, ACM Press, New York, NY.

Matsunaga, Yasuhiko et al., "Secure Authentication System for Public WLAN Roaming", Proceedings of the 1st ACM International Workshop on Wireless Mobile Applications and Services on WLAN Hotspots, Session: Services, 2003, pp. 113-121, ACM Press, New York, NY.

Steiner et al., "Kerberos: An Authentication Service for Open Network Systems," USENIX Winter Conference, 1988, pp. 191-202.

* cited by examiner

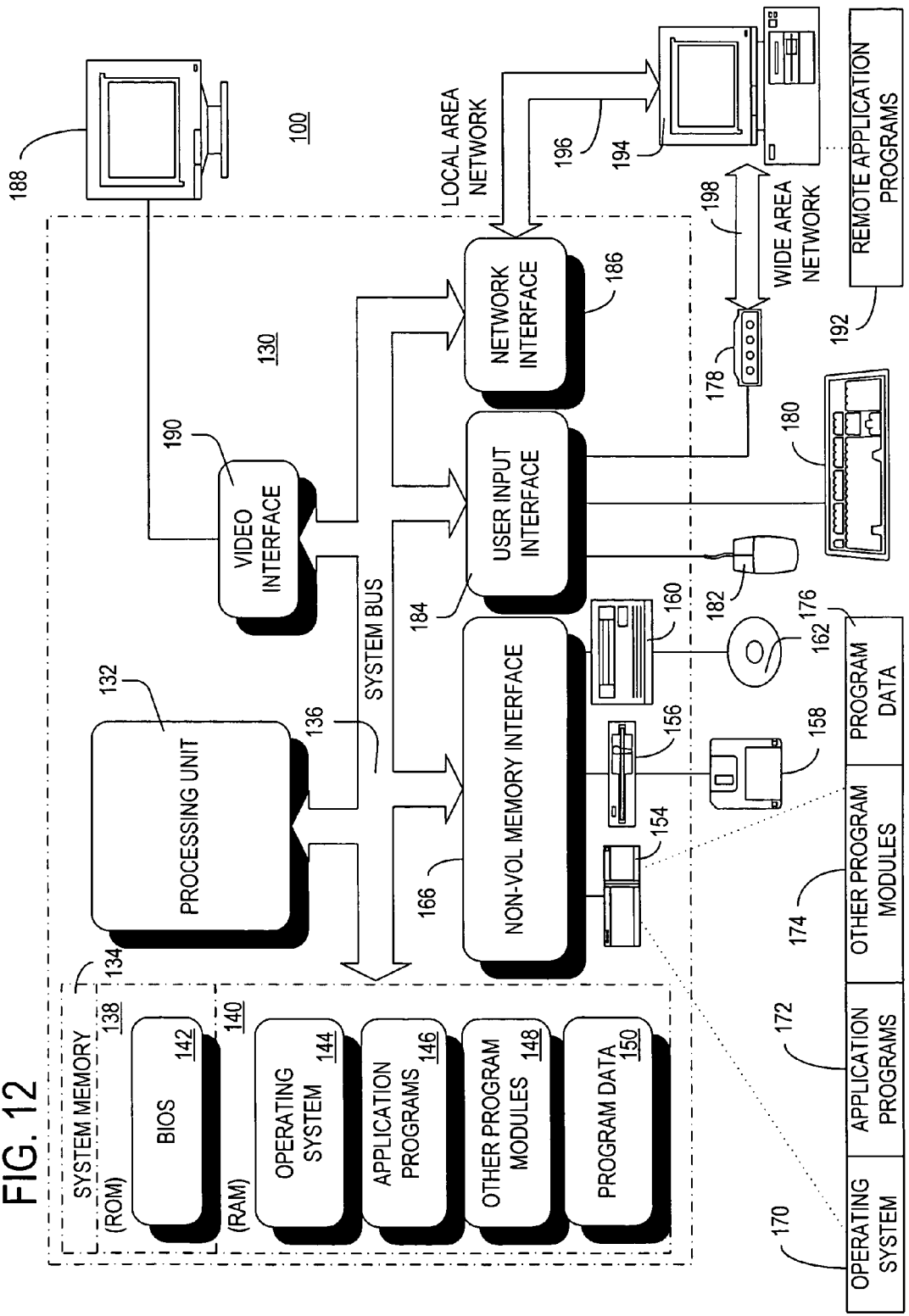

METHOD AND SYSTEM FOR RECOVERING PASSWORD PROTECTED PRIVATE DATA VIA A COMMUNICATION NETWORK WITHOUT EXPOSING THE PRIVATE DATA

TECHNICAL FIELD

The present invention relates to the field of computer network environments. In particular, this invention relates to a system and method for backup and recovery of private data roamable between one or more client computers linked via a communication network.

BACKGROUND OF THE INVENTION

Web services such as Internet sites very often provide information, products, services, and the like to their users. But a major concern to users and web services alike has been the security of the Internet, especially when transmitting sensitive information. Information security is often provided to users and/or web services through an encryption process. For example, Public Key Infrastructure (PKI) and Public-Key Cryptosystems are known Key Management services for communication security. These services are usually available only on a single computer as the private keys must be stored securely to retain privacy. It is desirable therefore to be able to roam, backup and recover private keys.

Existing private-key roaming protocols fail to address end-to-end security concerns and the recovery of data when a user cannot remember a primary password. Accordingly, a system for roaming private user data, while addressing the confidentiality, privacy, integrity, and authenticity of user data and user communications is desired.

SUMMARY OF THE INVENTION

The invention relates to improved roaming of private information between one or more clients linked via a communication network. In particular, the invention provides users the ability to roam private information (e.g., private keys) between clients linked to a server without the server having knowledge of or ever receiving the private information. Moreover, the invention provides users the ability to retrieve an encrypted version of a private key from the server, for decryption on a client, even when the user cannot remember a password associated with the encryption of that private key. By providing users the ability to roam private information between clients and conceal such information from the server, network security is greatly enhanced, and, thus, the ability of malicious users to interfere with secure communications is significantly reduced.

In accordance with one aspect of the invention, a method is provided for communicating private data between computers coupled to a data communication network. The method includes receiving, at a network server, private data encrypted by a first client as a function of a wrapping key unknown to the server. The server and the first client are coupled to the data communication network. The method further includes storing the received encrypted private data at the server. The method also includes receiving, at the server, a request from a second client for the encrypted private data. The method further includes transferring the encrypted private data from the server to the second client for decryption as a function of the wrapping key in response to the received request.

In accordance with another aspect of the invention, a system is provided for communicating private data on a data communication network. A server receives private data encrypted by a first client as a function of a wrapping key unknown to the server. The server and the first client are coupled to the data communication network. A database is associated with the server. The server is configured to store received encrypted private data in the database. The server is also configured to transfer the stored encrypted private data to a second client, coupled to the data communication network, for decryption as a function of a wrapping key in response to a request for the encrypted private data received from the second client.

In accordance with another aspect of the invention, a computer-readable medium having computer-executable instructions for communicating private data between computers coupled to a data communication network is provided. First receiving instructions receive, at a network server, private data encrypted by a first client as a function of a wrapping key unknown to the server. The server and the first client are coupled to the data communication network. Storing instructions store the received encrypted private data at the server. Second receiving instructions receive, at the server, a request from a second client for the encrypted private data. Transferring instructions transfer the encrypted private data from the server to the second client for decryption as a function of the wrapping key in response to the received request.

In accordance with yet another aspect of the invention, a method is provided for communicating private data between computers coupled to a data communication network. The method includes receiving, at a server, a request from a roaming client for encrypted private data. The request includes a digest or hashed value of an authentication password. The server and the roaming client are coupled to the data communication network. The method further includes determining if a form of the authentication password received from the roaming client is valid. The method further includes retrieving, when a form of the authentication password is valid, the encrypted private data, where the private data was previously encrypted as a function of a wrapping key unknown to the server. The method further includes transferring the retrieved encrypted private data from the server to the roaming client for decryption as a function of the wrapping key.

In accordance with another aspect of the invention, a computer-readable medium having a data structure stored thereon is provided. A first data field contains private data. A second data field contains key data representative of an input data stream received from a user. A third function field encrypts the private data as a function of the key data, and transfers the encrypted private data to a central location for storage.

Alternatively, the invention may comprise various other methods and apparatuses.

Other features will be in part apparent and in part pointed out hereinafter.

BRIEF DESCRIPTION OF THE DRAWINGS

FIG. 12 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
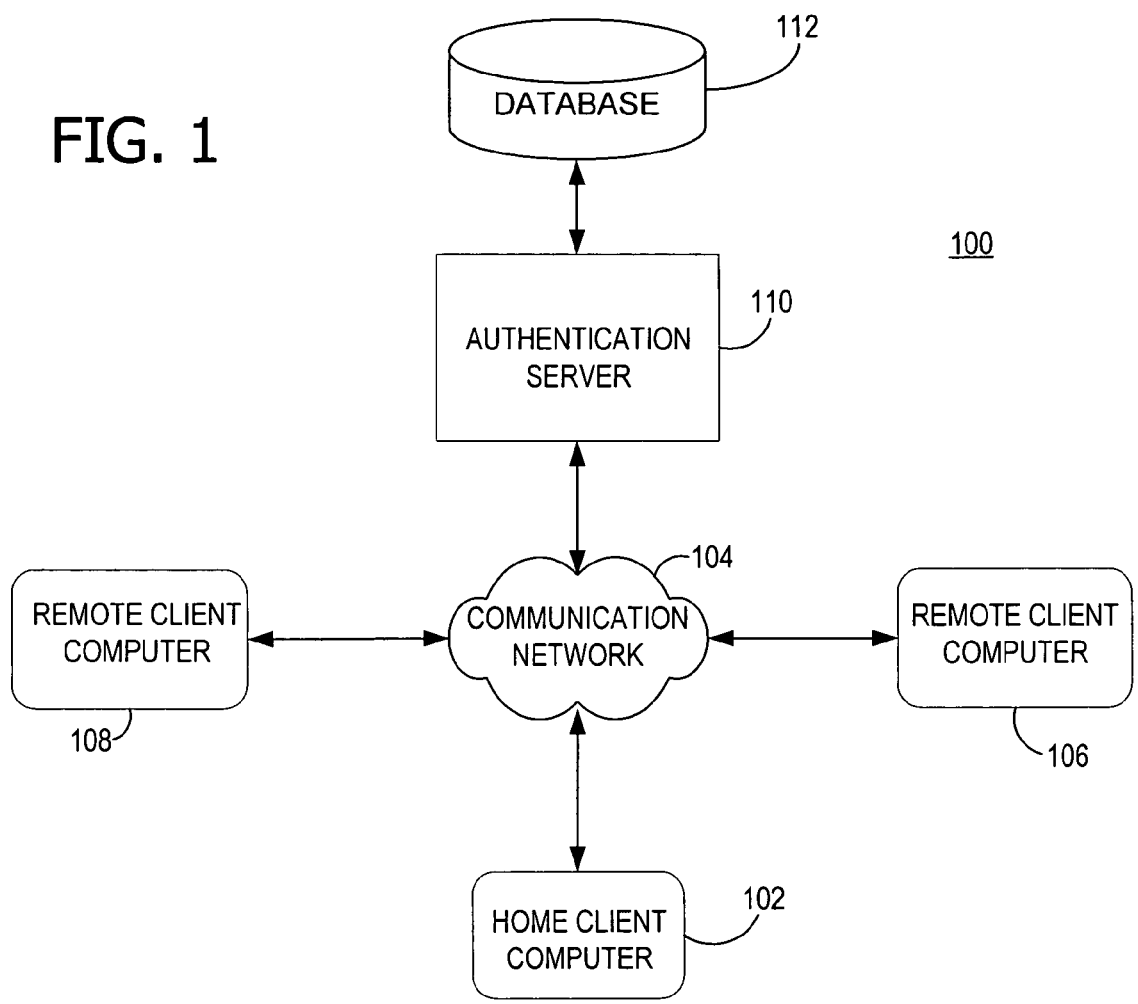
FIG. 1 is a block diagram illustrating an exemplary network environment in which the invention can be utilized.

Referring now to FIG. 1, a block diagram illustrates an exemplary network environment 100 having a home or local client computer 102 coupled to a data communication network 104. In this example, the network 104 is the Internet (or the World Wide Web). However, the teachings of the present invention can be applied to any data communication network. Multiple roaming or remote client computers 106 and 108 are also coupled to network 104. In turn, the home client computer 102 can communicate with roaming client computers 106 and 108 via network 104. Home client computer 102 denotes a computer that the user has a reason to trust because un-trusted third parties do not have unrestricted or easy physical access to it. Roaming client computers 106 and 108 denote computers in which the user has more limited trust because it is owned and physically controlled by a third party. An authentication server 110 coupled to network 104 allows communication between itself and the home client computer 102 and roaming client computers 106 and 108. Although referred to as an "authentication server," authentication server 110 in the illustrated embodiment is simply a web server capable of authenticating users as well as capable of interacting with web browsers and other web servers.

In this example, data is securely communicated between authentication server 110, client computer system 102, and roaming client computers 106 and 108 using Secure Sockets Layer (SSL), a protocol commonly used on the Internet to securely exchange information. More specifically, SSL can be used to implement public key encryption. As known to those skilled in the art, public-key encryption involves encoding information in such a way that only the person (or computer) with a private key can decode it. Computer encryption systems used today include: Symmetric-key encryption and Public-key encryption.

In symmetric-key encryption, each computer has a secret key (code) that it can use to encrypt a packet of information before it is sent over the network to another computer. Symmetric-key requires that you know which computers you will be communicating with so that you can install a key on each one. In order for this type of encryption to be successful both computers must know the secret code in order to decode the information.

In public key encryption, a combination of a private key and a public key are used for coding and decoding information. For example, a particular originating computer (e.g., home client) securely transmits information to a roaming client (e.g., roaming client) that has a public/private key pair. The originating computer utilizes the public key of the roaming client in a mathematical operation performed on the information to produce an encrypted message, and can sign this message with its own private key to assert the integrity of the message. The originating computer also provides its public key to the roaming client, but the private key remains private (i.e., secret) to the originating computer. To decode an encrypted message, the recipient must use its own private key, and uses the public key provided from the sender to verify the signature on that message. Thus, if the recipient, a user of the home client 102, desires the ability to decode an encrypted message via roaming clients 106 and 108 the user has to transfer the private key to these roaming clients.

An authentication database 112 is coupled to authentication server 110, and contains information necessary to authenticate a user of client computer system 102 (as well as other users on the network), and information necessary to determine whether the user of a home client computer or a roaming client computer has authority to store encryption data in the database and/or receive encryption data from the database 112.

Figure 2:
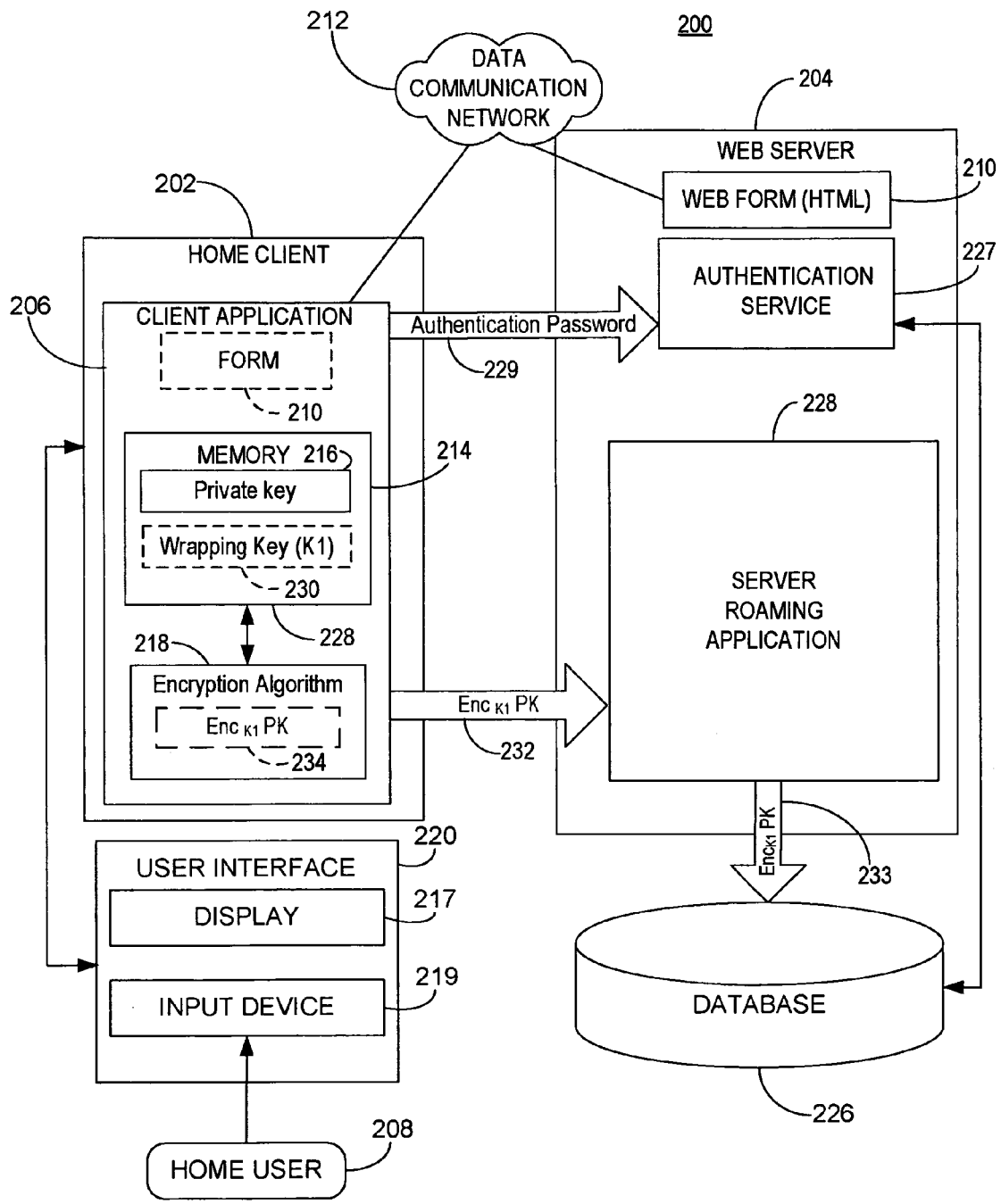
FIG. 2 is a block diagram illustrating a system for communicating encrypted private data between a home client and a server according to one embodiment of the invention.

Referring now to FIG. 2, a block diagram illustrates a system 200 for communicating encrypted private data between a home client 202 (e.g., a home client computer 102) and a web server 204 (e.g., authentication server 110) according to one embodiment of the invention.

A home client application 206 allows a home user 208 to encrypt private data and transfer the encrypted private data to the web server 204 via a communication network 212 (e.g., network 104). The home client application 206 is executable by the home client 202 and responsive to user input for initiating the encryption of the private data, and the transfer of the encrypted private data to the web server 204. In this embodiment, the home client application 206 includes a memory 214 storing a private key 216 used during a public key encryption process such as described above in reference to FIG. 1. The home client application 206 includes an encryption algorithm 218 for performing a mathematical operation on the private data to convert it into encrypted private data. More specifically, the encryption algorithm 218 is used in conjunction with key data to convert the private data. As known to those skilled in the art, a number of encryption algorithms (e.g., 3DES algorithm and HMAC-RC4™ algorithm) can be used to encrypt data such that it is nearly impossible to decrypt the content without knowledge of the encryption key.

The user 208 of the home client 202 may desire the ability to roam the private key 216 in order to communicate securely with web services via one or more roaming clients (e.g., roaming clients 106, 108). However, such roaming of the private key 216 can result in the private key 216 being intercepted by a malicious party. As a result, the ability of the user 208 to securely decrypt or sign data with that particular private key 216 can be substantially impaired.

A user-interface (UI) 220 linked to the home client 202 allows the user 208 to interact with the web server 204. For example, the UI 220 may include a display 217 such as a computer monitor for viewing data and/or input forms, and an input device 219 such as a keyboard or a pointing device (e.g., a mouse, trackball, pen, or touch pad) for entering data into the input form 210. In other words, UI 214 allows user 208 to select data on the home client 202 for encryption, and allows user 208 to submit a request to transfer encrypted data from the home client 202 to the web server 204 for storage.

A database 226 (e.g., database 112) is coupled to web server 204 and contains information necessary to validate a request from the home client 202 (as well as other users on the network) to store encrypted private data in database 226. Although database 226 is shown separately from authentication server 204, it is to be understood that in other embodiments of the invention, database 226 may be contained within web server 204.

In one embodiment, the web server 204 is a login server executing an authentication service 227 to authenticate a user 208 requesting access to the server 204. In such an embodiment, the web server 204 first requests authenticating information from the user 208, such as an authentication password, as indicated by reference character 229, prior to allowing the user access to a web service provided by the web server 204.

Referring further to FIG. 2, a home client 202 wishes to store an encrypted private key on the server 204 using home client application 206. Before doing so, the home client application 206 needs to authenticate/authorize user 208 to the server 204. In this embodiment an authentication password provided by the user 208 is used to authenticate user 208 to server 204.

In order to transfer and store private data securely, the home client application 206 requests input data such as an encryption password from the user 208. The home client application 206 and UI 220 allow the user 208 to input an encryption password. The home client application 206 is responsive to an encryption password input by the user 208 to generate a wrapping key K1 230, with which to encrypt the private data. In this embodiment, the wrapping key K1 is a symmetric key used to encrypt the private key (e.g., create a hash value). The home client application 206 transfers encrypted private data to the server roaming application 228, as indicated by reference character 232. The authentication password and encryption password are illustrated as separate passwords in the interest of securing the privacy of user data. However, it is to be understood that they could be a single password. It is also to be understood that web server 204 could use different authentication mechanisms to authenticate user 208 such as smart cards, one time passwords as well as biometrics.

A server roaming application 228 (i.e., web service) executed by the server 204 stores the received encrypted private data in the database 226, as indicated by reference character 233. In this example, the private data is the private key 216 stored in the memory 216, and the private key is encrypted with the encryption algorithm 218 as a function of the generated wrapping key 230 to generate an encrypted private key EKIPK 234. Notably, the generated wrapping key and the private key 216 remain unknown to the web server 204. Furthermore, since the server does not possess the encryption password used to generate the wrapping key 230, the server roaming application is not able to decrypt the encrypted private key 234.

Figure 3:
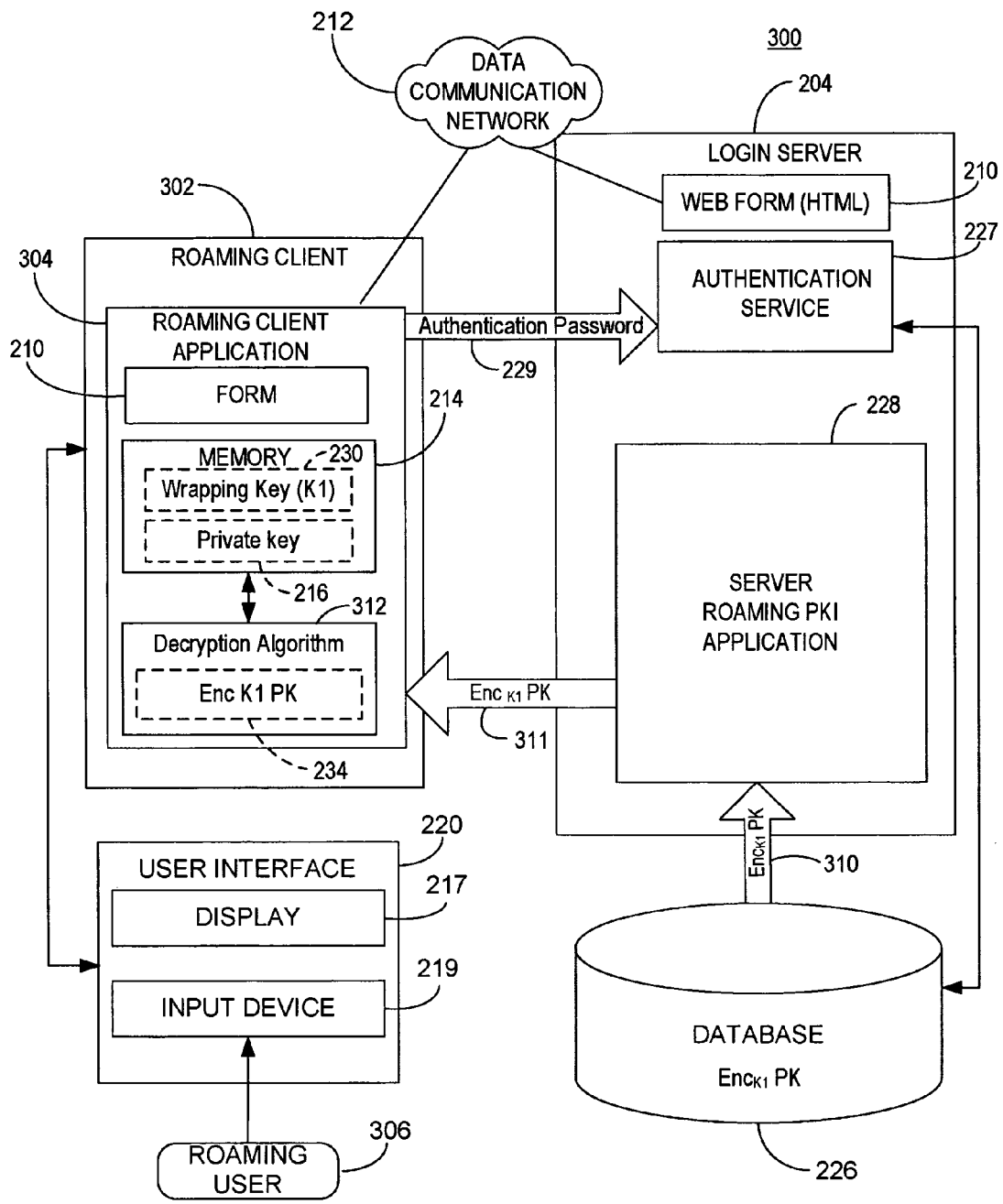
FIG. 3 is a block diagram illustrating a system for communicating encrypted private data between a roaming client computer and a server according to one embodiment of the invention.

Referring now to FIG. 3, a block diagram illustrates a system 300 for communicating encrypted private data between a roaming client 302 and the web server 204 according to one embodiment of the invention.

In this embodiment, the server roaming application 228 receives a request from the roaming client 302 via roaming client application 304 and communication network 212 to retrieve stored encrypted private data from the database 226. The server roaming application 228 is responsive to the received request, and executable by web server 204, for authenticating roaming user 306. In this embodiment, server 204 requests the authentication password from roaming user 306 via an input form 210 such as shown in FIG. 2.

In substantially the same manner as described above in reference to FIG. 2, the server roaming application 228 validates a form of the authentication password received from the client to determine if the roaming user 306 is authorized to retrieve encrypted data from the database. If the authentication password is not validated, the server roaming application 228 denies the roaming client 302 access to the encrypted private data stored in the database 226. Alternatively, if the authentication password is validated, the server roaming application 228 retrieves encrypted data from the database 226, as indicated by reference character 310, and transfers the encrypted data to the roaming client 302, as indicated by reference character 311. The roaming client application 304 is responsive to the received encrypted private data to request the encryption password from the user 306 and generate the wrapping key K1 and to execute a decryption algorithm 312. In this case, the decryption algorithm 312 decrypts the received encrypted private data as a function of the wrapping key 230 generated on the roaming client 302 to obtain the private key associated with the home client 202. Thereafter, the roaming client application 304 can store the obtained private key in a memory 214 associated with the roaming client 302.

Figure 4:
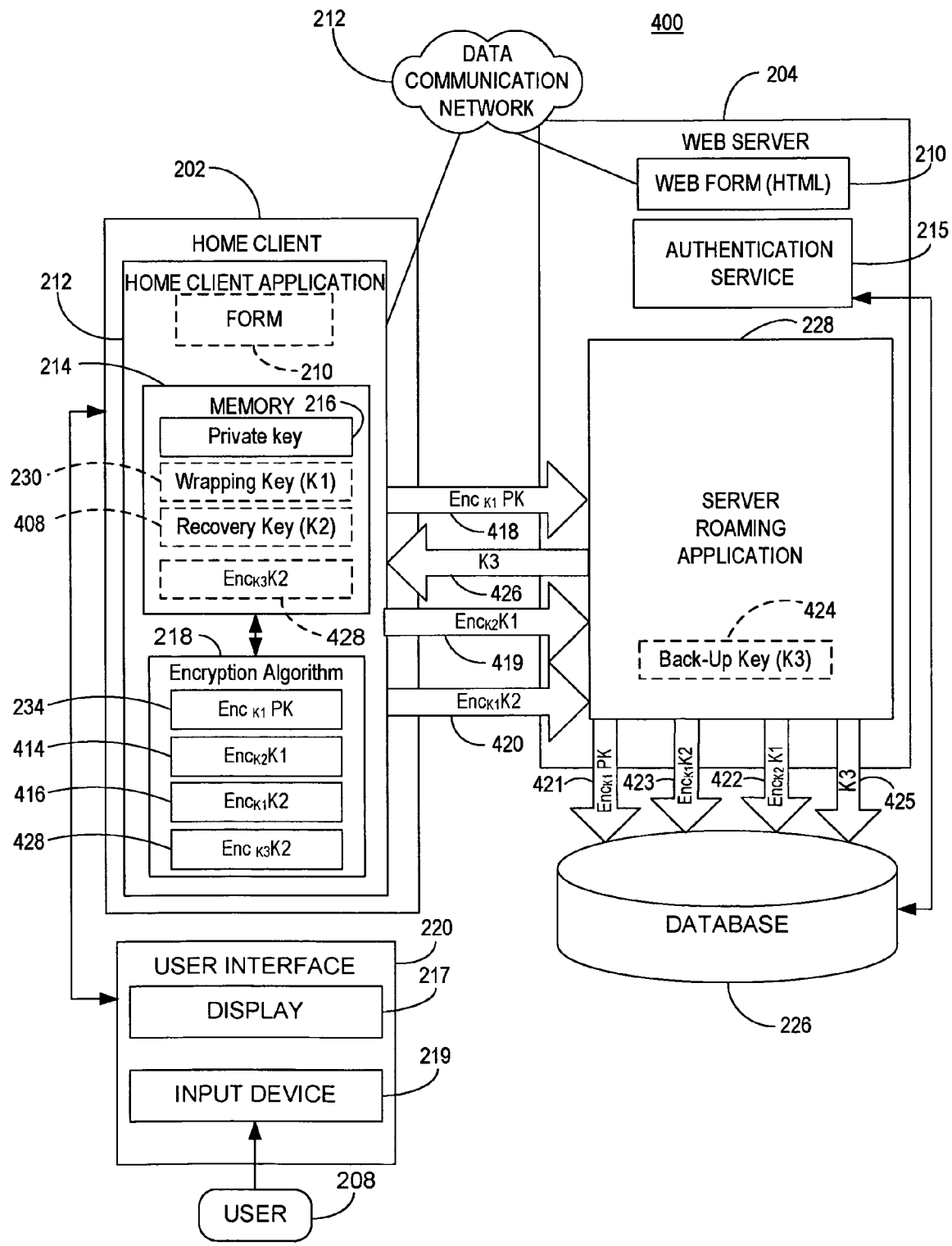
FIG. 4 is a block diagram illustrating a system for communicating encrypted private data and recovery data between a home client and a server according to one embodiment of the invention.

Referring now to FIG. 4, a block diagram illustrates a system 400 for communicating encrypted private data and recovery data between the home client computer 202 and the server 204 according to another preferred embodiment of the invention.

In this embodiment, the home user 208 uses the UI 220 to select a recovery option to have the ability to recover encrypted private data stored on the server 204 even when the user cannot remember the encryption password. In this embodiment, in addition to generating the wrapping key K1, as a function of the encryption password, as described above in reference to FIG. 2, home client application 212 is responsive to the recovery key request, to randomly generate a new encryption key (i.e., recovery key K2). For instance, after user 208 has input the encryption password into a form (not shown), the user 208 uses, for example, a mouse to click a "YES" button presented to the user along with a dialog box displaying the message "ENABLE PRIVATE DATA RECOVERY WITHOUT ENCRYPTION PASSWORD." The home client application 206 is responsive to to a "YES" selection by the user to randomly generate the recovery key K2. Notably, K2 is not linked in any way to the encryption password. The server roaming application 228 authenticates user 208 by validating the authentication password received from the client. If the authentication password is validated, the user 208 is allowed to transfer encrypted private data including a private key encrypted with the wrapping key $E_{K1}PK$ 234, a wrapping key encrypted with the recovery key $E_{K2}K1$ 414, and a recovery key encrypted with the wrapping key $E_{K1}K2$ 416 to the server 204, as indicated by 418, 419, and 420 respectively. The server roaming application 228 is responsive to the received encrypted private data to store $E_{K1}PK$, $E_{K2}K1$ 414, and $E_{K1}K2$ in the database 226, as indicated by 421, 422, and 423 respectively. Moreover, the server roaming application 228 is responsive to encrypted data received from the home client 202 to randomly generate a backup key K3 424 for storage in the database 226, as indicated by 425, and to transfer the generated backup key 424 to the home client 202, as indicated by 426. Note that the transfer of K3 occurs via a secure channel (e.g., over SSL.) Without a secure channel, the value could be changed so that the recovery key can be easily discovered. The home client application 206 is responsive to the received backup key 424 to generate a second encrypted recovery key $E_{K3}K2$ 428 to store in memory 214 and/or on a disk associated with the home client 202.

In this embodiment, the encryption algorithm 216 is used to generate the encrypted private key 234, the encrypted wrapping key 414, the first encrypted recovery key 416, and the second encrypted recovery key 428. The encrypted private key 234 represents the private key encrypted as a function of the wrapping key, the encrypted wrapping key 414 represents the wrapping key encrypted as a function of the recovery key K2, the first encrypted recovery key 416 represents the recovery key 408 encrypted as a function of the wrapping key K1, and the second encrypted recovery 428 key represents the recovery key 408 encrypted as a function of the backup key 424. Although, the invention is described herein as using the same encryption algorithm, it is contemplated that different encryption algorithms can be used to generate each of the different encrypted keys.

Figure 5:
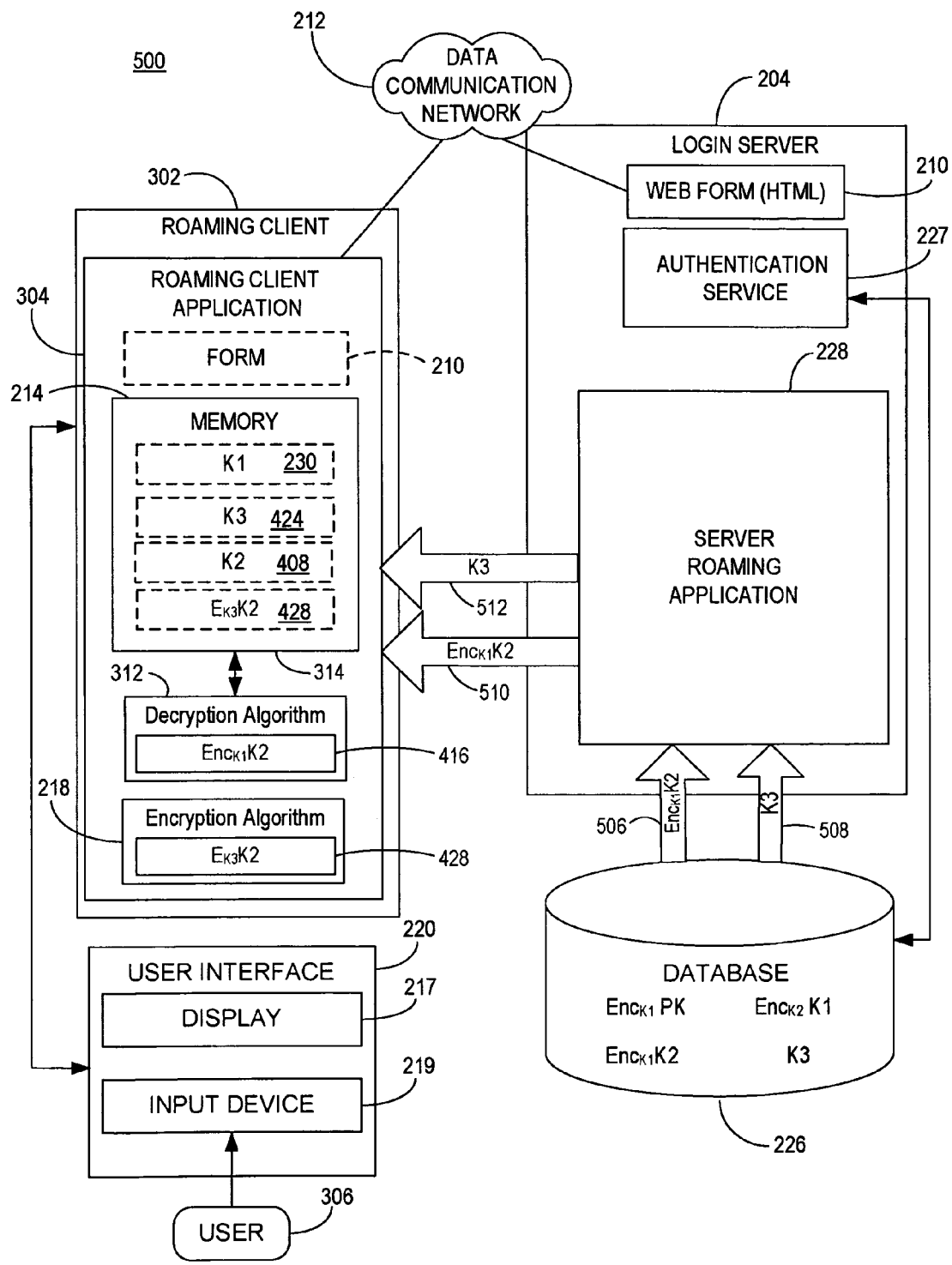
FIG. 5 is a block diagram illustrating a system for communicating recovery data from a server to a roaming client according to one embodiment of the invention.

Referring now to FIG. 5, a block diagram illustrates a system 500 for transferring recovery data from the server 204 to the roaming client 302 according to one embodiment of the invention.

In this embodiment, the server roaming application 228 receives a request from a roaming client 302 via remote roaming client application 304 and communication network 212 to retrieve backup data from the database 226. In this instance, the backup data is the first encrypted recovery key 416 and the backup key 424. The server roaming application 228 authenticates user 208 by validating a form of the authentication password received from the client. If the authentication password is validated, the server roaming application 228 retrieves the first encrypted recovery key 416 and backup key 424 from the database 226, as indicated by reference characters 506, 508 respectively, and transfers $E_{K1}K2$ and K3 to the roaming client application 304, as indicated by reference characters 510, 512 respectively. Alternatively, if the authentication password is not validated, the server roaming application 228 denies access to the database 226.

The roaming client application 304 is responsive to the received first encrypted recovery key 416 to request the encryption password 504 from the user, generate the wrapping key K1, and execute the decryption algorithm 312. In this case, the decryption algorithm 312 decrypts the received first encrypted recovery key 416 as a function of the wrapping key 230 generated on the roaming client 302 to obtain the recovery key 408 associated with the home client computer 202. The roaming client application 304 is responsive to the received backup key 424 to execute the encryption algorithm 218. In this case, the encryption algorithm 218 encrypts the obtained recovery key 408 as a function of the received backup key 424 to generate the second encrypted recovery key 428. Thereafter, the roaming client application 304 stores the second encrypted recovery key 428 in the memory 214 and onto disk associated with the roaming client 302. As a result of having the second encrypted recovery key 428 stored in memory 214, the backup key 424 and the encrypted wrapping key from the server, the roaming client 302 can recover and decrypt an encrypted private key 234 being stored in database 226 without having knowledge of a password (i.e., encryption password) used to generate the wrapping key K1.

Figure 6:
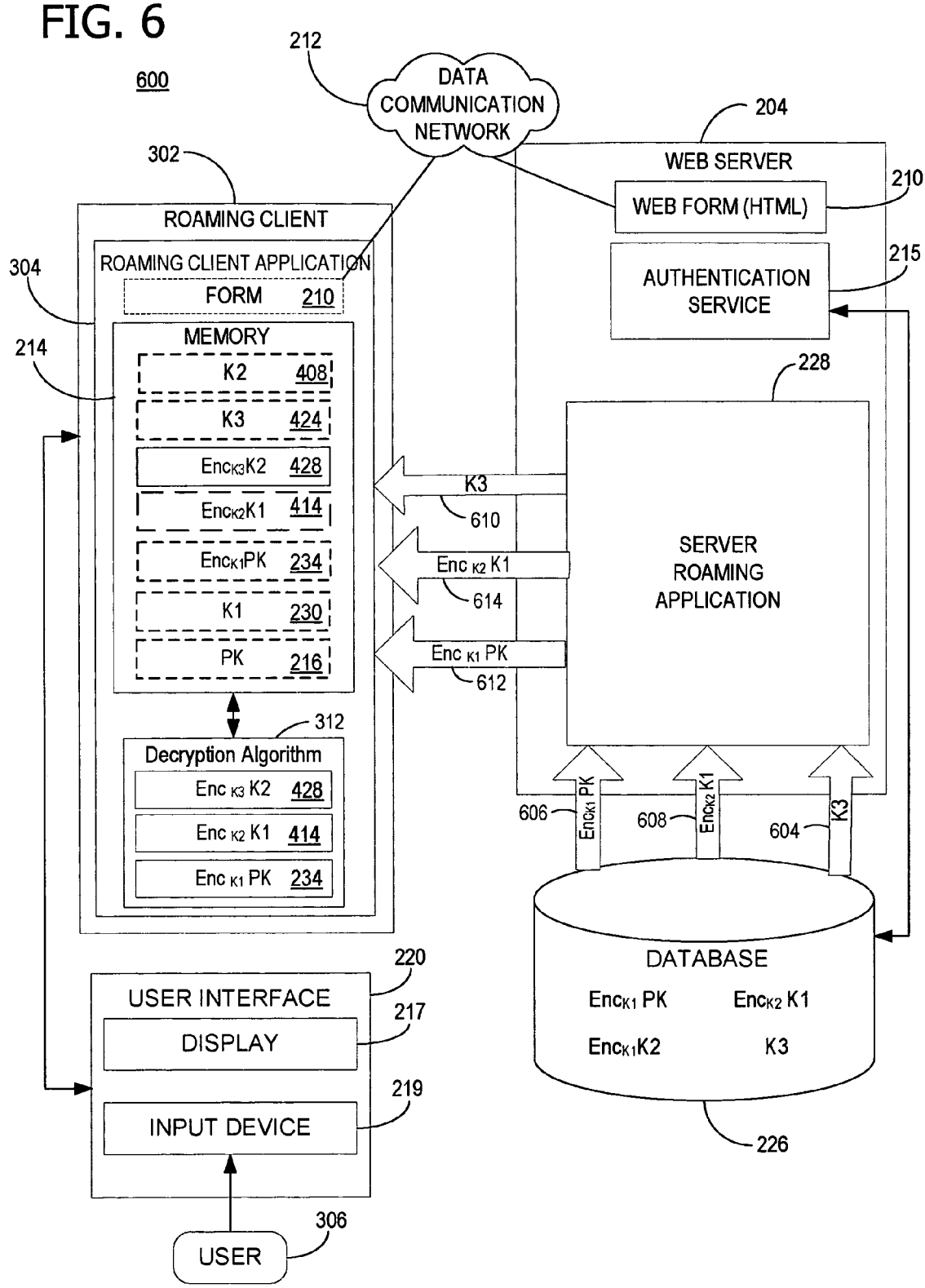
FIG. 6 is a block diagram illustrating a system for recovering encrypted private data from a server to a roaming client without an encryption password according to one embodiment of the invention.

Referring now to FIG. 6, a block diagram illustrates a system 600 for recovering encrypted private data from the web server 204 at the roaming client 302 without having knowledge of the encryption password according to one embodiment of the invention.

In this embodiment the backup process described above has been preformed on the roaming client 302 so that roaming client 302 has second encrypted recovery key 428 in memory 214. The server roaming application 228 receives a request from a roaming client 302 via roaming client application 304 and communication network 212 to retrieve encrypted private data such as a private key 216 from the database 226. The server roaming application 228 authenticates user 302 by validating the authentication password received from the client. When the user is successfully authenticated, the server application transfers the encrypted private data 216 to the roaming client application 304. As described above in reference to FIGS. 3 and 5, the roaming client application 304 is responsive to the encrypted private data to request the encryption password from the roaming user 306 in order to generate the wrapping key K1.

If the user 306 does not remember the encryption password, the user uses, for example, the UI select a "YES" option presented to the user along with another dialog box (not shown) that displays a message "RECOVER PRIVATE DATA WITHOUT ENTERING ENCRYPTION PASSWORD." The server roaming application 228 is responsive to the recovery request to retrieve the backup key 424, the encrypted private key 234, and the encrypted wrapping key 414 from the database 226, as indicated by reference characters 604, 606, and 608 respectively, and transfers the retrieved K3, $E_{K1}PK$, and $E_{K2}K1$ to the roaming client application 304, as indicated by reference characters 610, 612, and 614 respectively.

The roaming client application 304 is responsive to the received backup key 424, the encrypted private key 234, and the encrypted wrapping key 414 to execute the decryption algorithm 312. In this case, the decryption algorithm 312 decrypts the second encrypted recovery key 428, previously stored in the memory (See FIG. 5), as a function of the received backup key 424 to obtain the recovery key 408 associated with the home client 202. The decryption algorithm 312 then decrypts the received encrypted wrapping key 414 as a function of the obtained recovery key 408 to obtain the wrapping key 230. The decryption algorithm 312 then decrypts the received encrypted private key 234 as a function of the obtained wrapping key 230 to obtain the private key 216 associated with the home client 202. Thereafter, the roaming client application 304 stores the obtained private key PK in the memory 214 associated with the roaming client 302.

Figure 7:
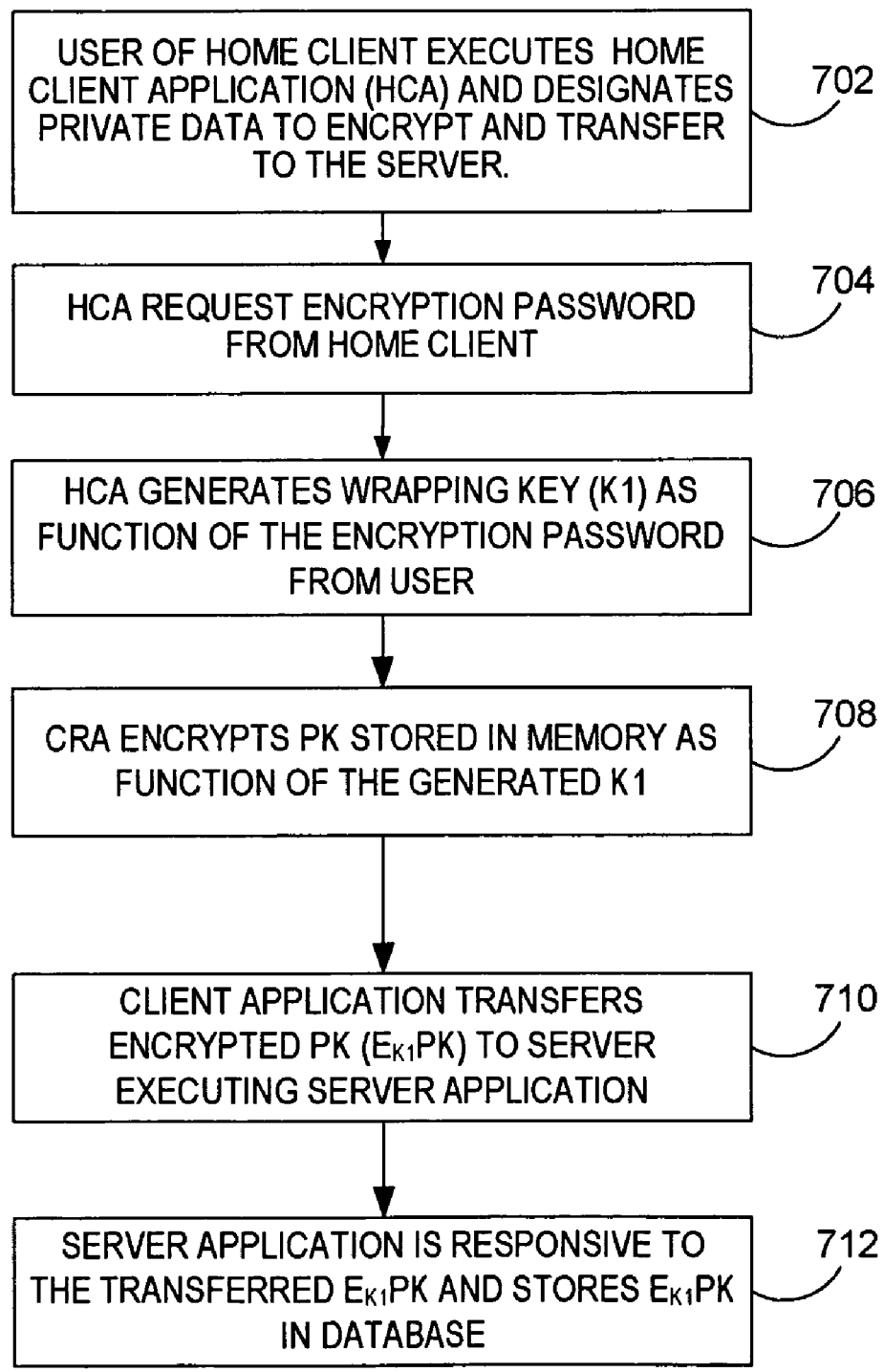
FIG. 7 is an exemplary flow chart illustrating a method of communicating private data between a home client and a server according to one embodiment of the invention.

Referring now to FIG. 7, an exemplary flow chart illustrates a method of communicating private data between a home client computer and a server to facilitate private data recovery by a roaming client computer according to one embodiment of the invention. At 702 the user of the home client computer executes a home client application and designates private data (e.g., private key), stored in a memory associated with the home client computer, to encrypt and transfer to the server. The home client application requests an encryption password from the user at 704. At 706, a wrapping key is generated as a function of the encryption password received from the user. The designated private data is encrypted as a function of the generated wrapping key at 708. The home client application transfers the encrypted data to a server executing a server roaming application at 710. The server application is responsive to the transferred encrypted private data, and the encrypted private data is stored in a database linked to the server at 712.

Figure 8:
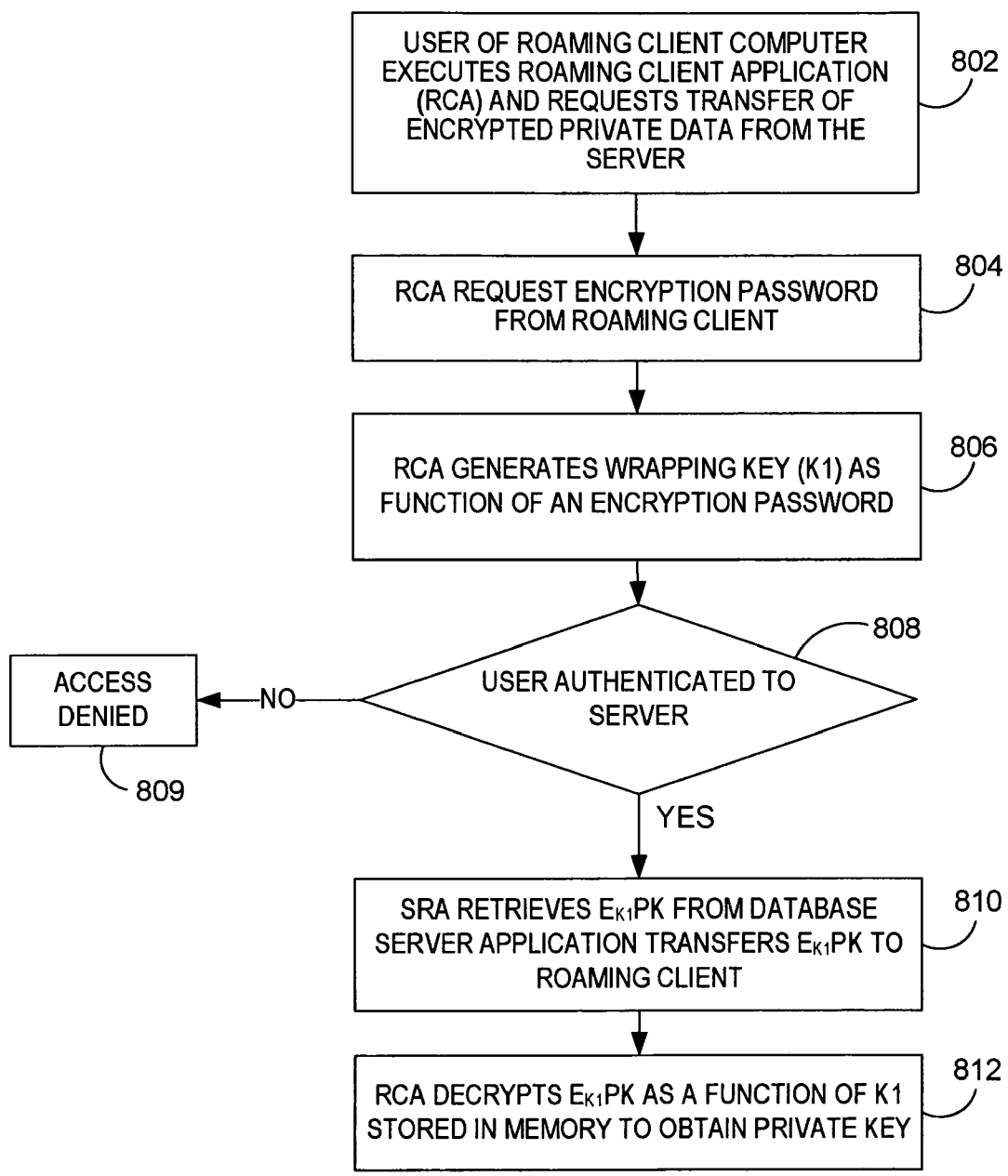
FIG. 8 is an exemplary flow chart illustrating a method of communicating encrypted private data from a server to a roaming client according to one embodiment of the invention.

Referring now to FIG. 8, an exemplary flow chart illustrates a method of transferring encrypted private data from a server to a roaming client computer according to one embodiment of the invention.

At 802, the user of the roaming client computer executing a roaming client application requests transfer of encrypted private data from the server executing a server roaming application. In this example, the user requests transfer of an encrypted private key $E_{K1}PK$ previously stored in a database linked to the server by a method such as described above in reference to FIG. 7. The roaming client application requests an encryption password from the user at 804. At 806, a wrapping key is generated by the roaming client application as a function of the encryption password received from the user. An authentication service first authenticates the user using a certain authentication mechanism such as password matching. If authentication fails 808, the server roaming application denies the user access to the requested encrypted data at 809. If the authentication succeeds 806, the server roaming application retrieves the requested encrypted private key $E_{K1}PK$ from the database and transfers the retrieved encrypted private key to the roaming client computer at 810. At 812 the roaming client application decrypts the received encrypted private key $E_{K1}PK$ as a function of the generated wrapping key 230 to obtain the private keyPK.

Figure 9A:
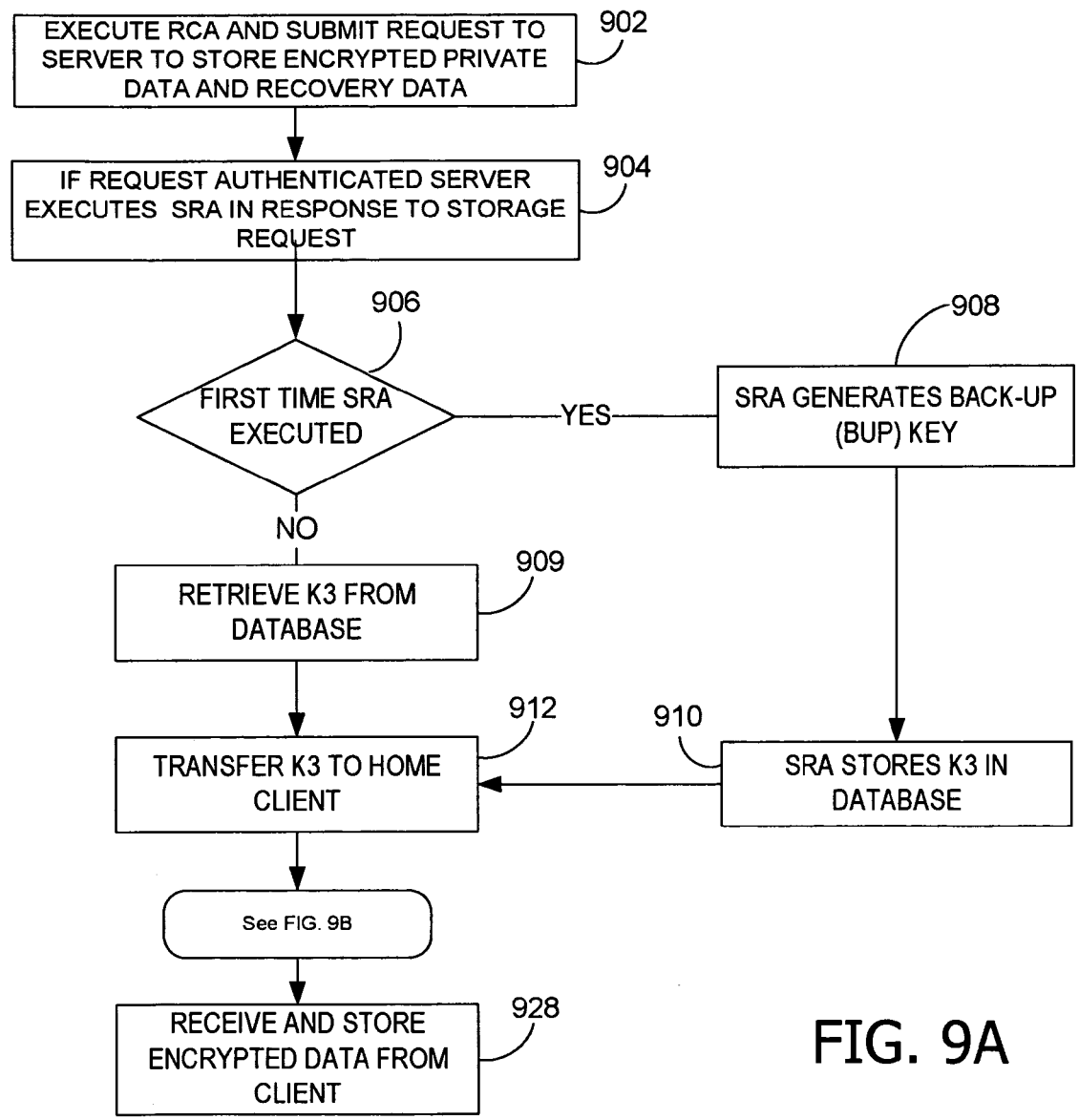
FIGS. 9A and 9B are an exemplary flow chart illustrating a method of communicating encrypted private data and recovery between a server and a home client according to one embodiment of the invention.
Figure 9B:
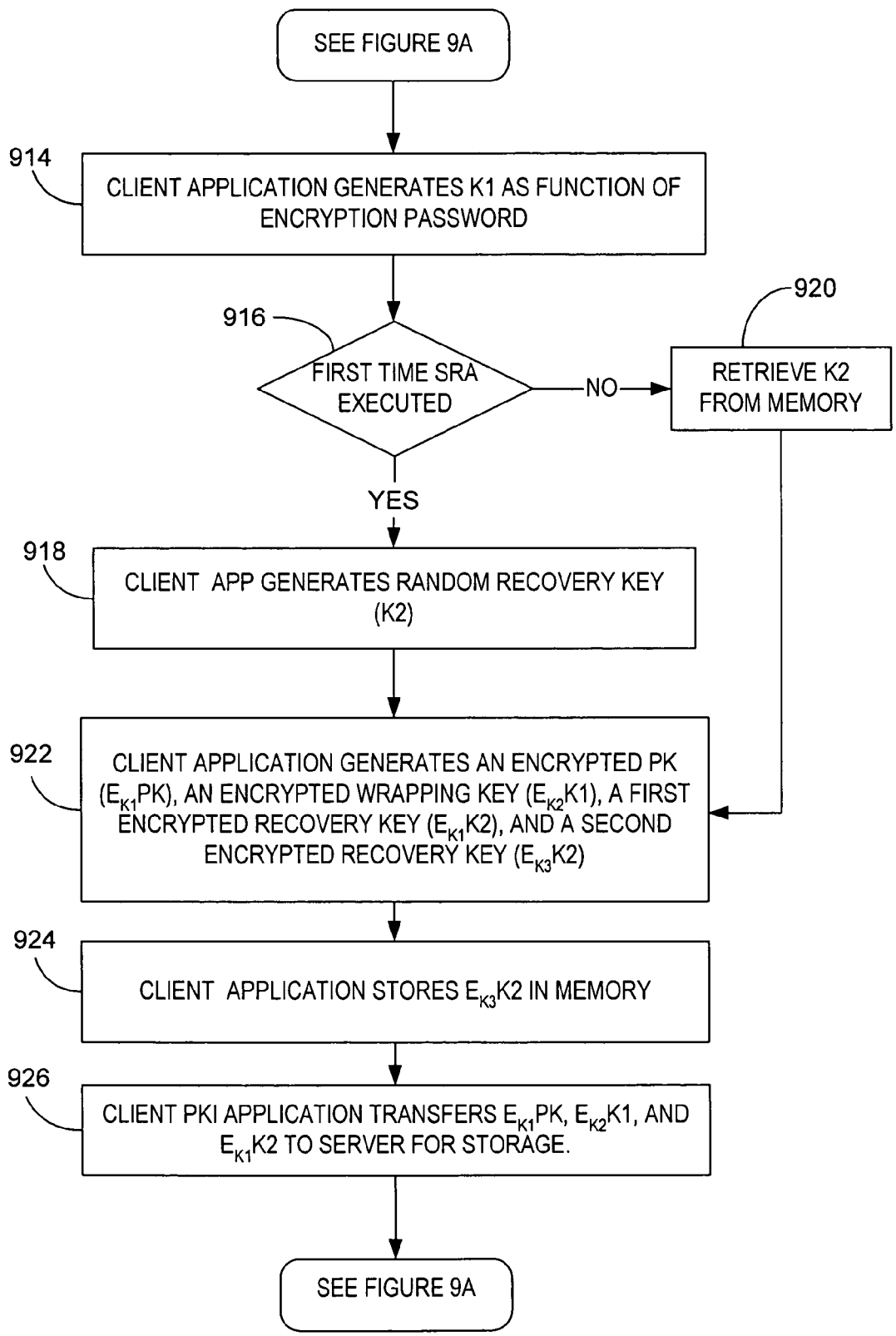

Referring now to FIGS. 9A and 9B, exemplary flow charts illustrate a method of communicating private data and recovery data between a home client computer and a server according to one embodiment of the invention.

At 902 the user of the home client computer executes a roaming client application and designates private data stored in a memory of the home client computer to encrypt, and submits a request to transfer the designated private data to the server. If the request is authenticated as discussed above in reference to FIG. 8, the server executes a roaming server application at 904. The server roaming application determines if this is the first time the SRA is executed in response to a request from the particular home client at 906. If the server roaming application determines this is first execution at 906 or that a backup key K3 cannot be found in the database for this user, the server roaming application generates a random backup key K3 at 908. At 910, the server roaming application stores the backup key K3 in a database, and provides the backup key K3 to the home client application for use in encrypting recovery data at 912. If the server roaming application determines this is not the first execution at 906 the server roaming application retrieves the backup key from the database at 909, and provides the backup key K3 to the home client application for use in encrypting recovery data at 912.

Referring now to FIG. 9B, the home client application generates a wrapping key K1 as a function of the encryption password provided by the user at 914. The home client application determines if a recovery key K2 is stored on the home client computer at 916. If the home client application determines that a recovery key K2 is not stored in a memory associated with the home client at 916, and a first encrypted recovery key $E_{K1}K2$ does not exist on the server, the home client application generates a random recovery key K2 at 918. For example, if this were the first execution of home client application, a recovery key would not exist on the home client computer. If the home client application determines that a recovery key K2 is stored in a memory associated with the home client 916, the home client application retrieves the recovery key K2 from memory at 920. At 922, the home client application generates an encrypted private key, and encrypted wrapping key K1, a first encrypted recovery key, and a second encrypted recovery key. The encrypted private key represents the private key PK encrypted as function of the generated wrapping key K1. The encrypted wrapping key $E_{K2}K1$ represents the wrapping key K1 encrypted as a function of the recovery key K2. The first encrypted recovery key $E_{K1}K2$ represents the recovery key K2 encrypted as function of the wrapping key K1. The second encrypted recovery key $E_{K3}K2$ represents the recovery key K2 encrypted as a function of a backup key K3 transferred from the server. At 924, the home client application stores second encrypted recovery key $E_{K3}K2$ in a memory associated with the home client computer. The home client application transfers the encrypted private key, encrypted wrapping key, first encrypted recovery key, and first encrypted recovery key to the server at 926. Referring back to FIG. 9A, at 928, the server roaming application receives and stores the transferred encrypted private key, encrypted wrapping key, and first encrypted recovery key in the database.

Figure 10:
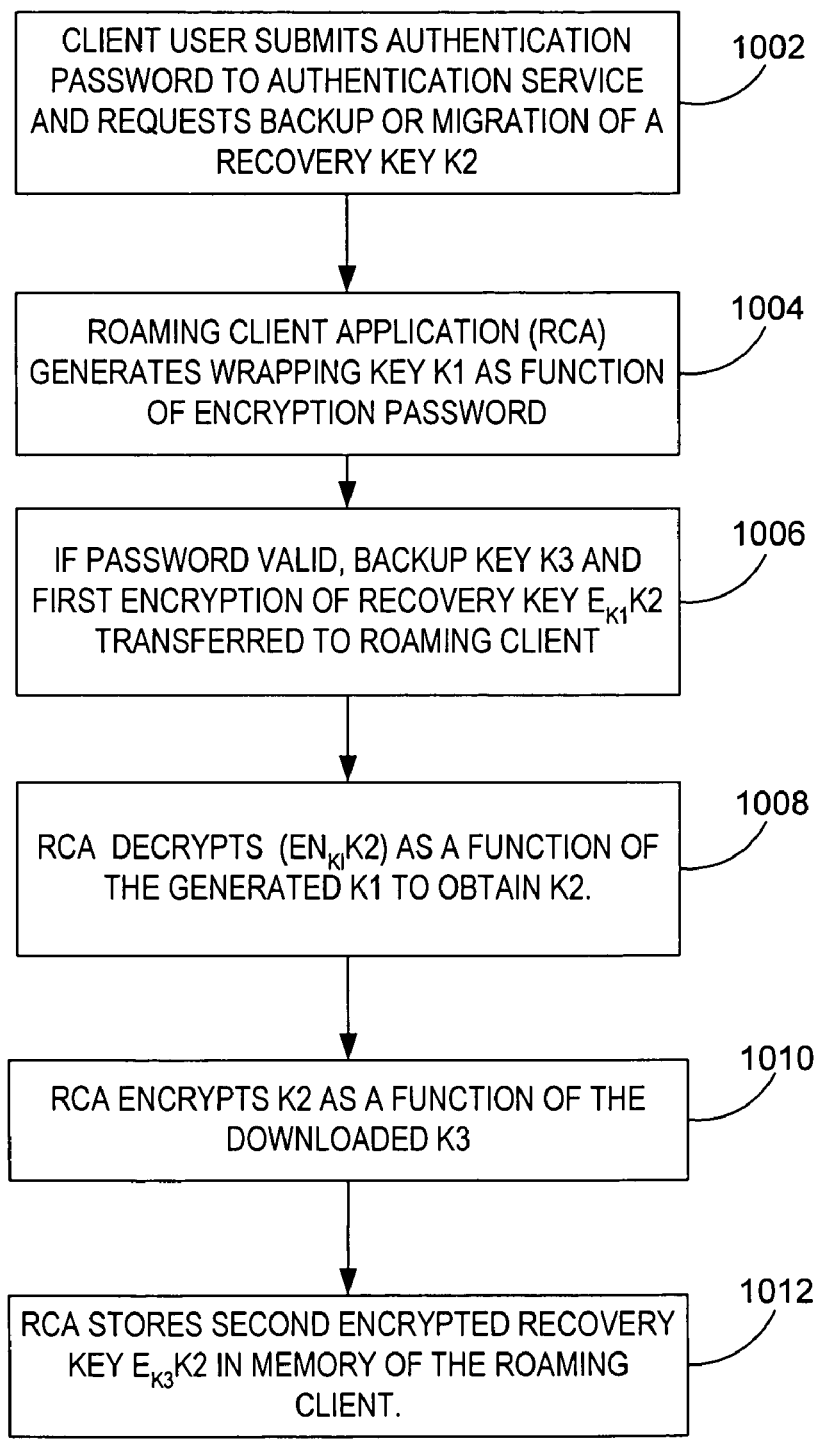
FIG. 10 is an exemplary flow chart illustrating a method of communicating recovery data between a server and a roaming client according to one embodiment of the invention.

Referring now to FIG. 10, an exemplary flow chart illustrates a method of transferring recovery data from a server to roaming client to enable the roaming client to retrieve private data without an encryption password. At 1002, server, executing a roaming server application, receives an authentication password from the user of a roaming client, executing a roaming client application, and a request to migrate or backup recovery data. The roaming client application is responsive to an encryption password provided by the authenticated user to generate a wrapping key K1 at 1004. At 1006, a backup K3, and a first encrypted recovery key $E_{K1}K2$ is transferred by the roaming server application to the roaming client application. The roaming client application decrypts the received first encrypted recovery key $E_{K1}K2$ as a function of the generated wrapping key K1 to obtain K2 at 1008. At 1010, the client application encrypts the obtained recovery key K2 as a function of the received backup key K3 to generate a second encrypted recovery key $E_{K3}K2$. The roaming client application stores the generated second encrypted recovery key in a memory associated with the roaming client computer at 1012.

Figure 11:
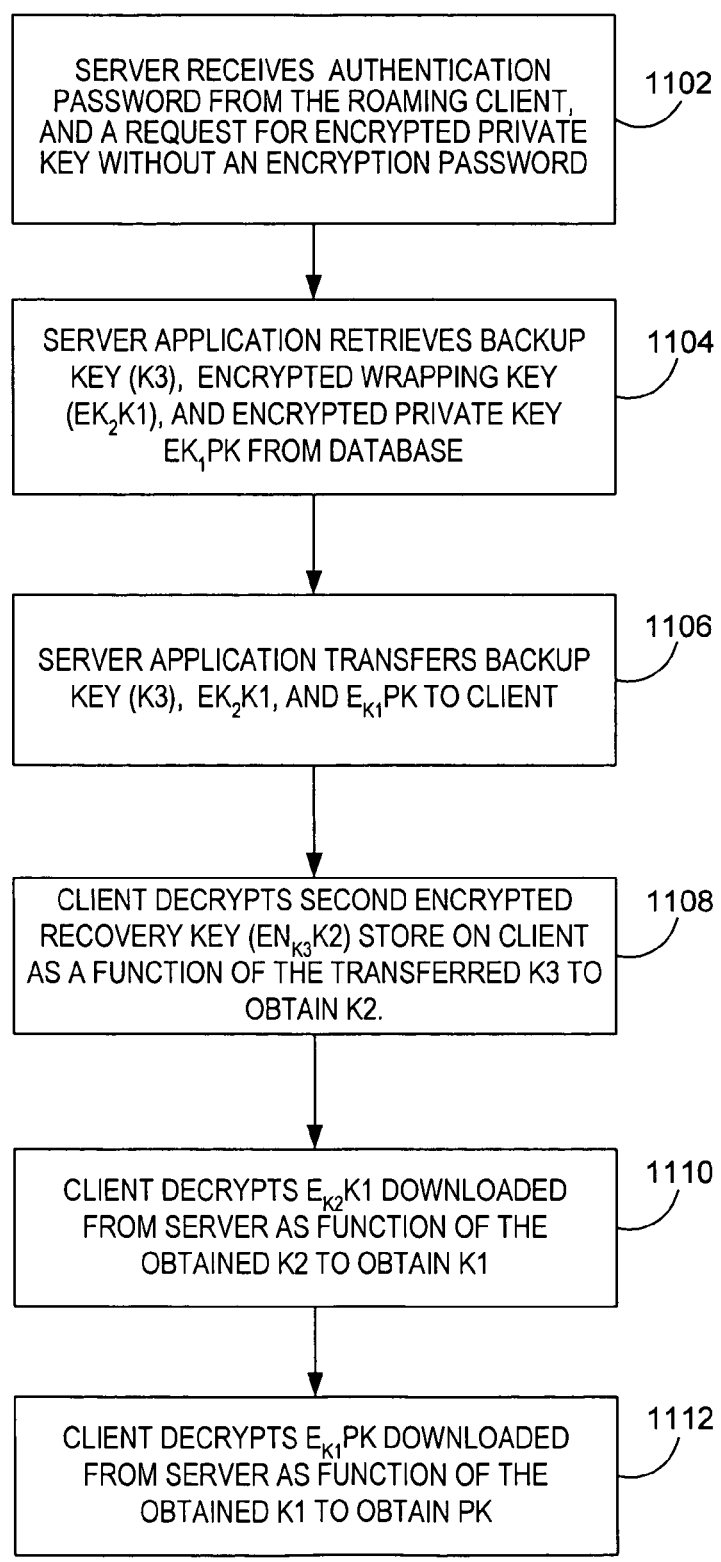
FIG. 11 is an exemplary flow chart illustrating a method of recovering encrypted private data from a server to roaming client without an encryption password according to one embodiment of the invention.

Referring now to FIG. 11, an exemplary flow chart illustrates a method for recovering private data from a server at the roaming client without an encryption password. At 1102, the server receives an authentication password from the roaming client, executing a roaming client application, and a request for transfer of an encrypted private key without an encryption password. The roaming server application retrieves the backup key, encrypted wrapping key $E_{K2}K1$, and the encrypted private key EKIPK from the databases at 1104. At 1106, the roaming server application transfers the retrieved backup key, encrypted wrapping key, and encrypted private key to the roaming client. The roaming client application decrypts a second encrypted recovery key $E_{K3}K2$, previously stored on the roaming client (See FIG. 10), as a function of the retrieved backup key K3 to obtain the recovery key K2 at 1108. At 1110, the roaming client application decrypts the encrypted wrapping key $E_{K2}K1$ as a function of the obtained recovery key K2 to obtain the wrapping key K1. The roaming client application decrypts the encrypted private key as a function of the obtained wrapping key at 1112.

Notably, by generating K2 on the client and never exposing it to the server we are able to backup both the encryption password key K1 and the recovery key K2 on the server without the server every knowing any of them. At the same time since the client knows at least one of the two keys—i.e. either the user enters the encryption password K1 or K2 has been previously stored at the client, the client is able to user $E_{K1}K2$ and $E_{K2}K1$ for restoring private data and also for performing backup.

FIG. 12 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer-readable media. Computer-readable media, which include both volatile and nonvolatile media, removable and non-removable media, may be any available medium that can be accessed by computer 130. By way of example and not limitation, computer-readable media comprise computer storage media and communication media. Computer storage media include volatile and nonvolatile, removable and non-removable media implemented in any method or technology for storage of information such as computer-readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer-readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer-readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 12 illustrates operating system 144, application programs 146, other program modules 148, and program data 150.

The computer 130 may also include other removable/non-removable, volatile/nonvolatile computer storage media. For example, FIG. 12 illustrates a hard disk drive 154 that reads from or writes to non-removable, nonvolatile magnetic media. FIG. 12 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 12, provide storage of computer-readable instructions, data structures, program modules and other data for the computer 130. In FIG. 12, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown)

such as a printer and speakers, which may be connected through an output peripheral interface (not shown).

The computer 130 may operate in a networked environment using logical connections to one or more roaming clients, such as a roaming client 194. The roaming client 194 may be a personal computer, a server, a router, a network PC, a peer device or other common network node, and typically includes many or all of the elements described above relative to computer 130. The logical connections depicted in FIG. 12 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 12 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and roaming client storage media including memory storage devices.

In operation, computer 130 executes computer-executable instructions such as those illustrated in FIGS. 7 thru 11 to encrypt and transfer private data and/or retrieve and decrypt private data.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the constructions and methods without departing from the scope of the invention, it is intended that all matter contained in the above description and shown in the accompanying drawings shall be interpreted as illustrative and not in a limiting sense.

What is claimed is:

1. A method of communicating private data between computers coupled to a data communication network, said computers including a first client and a second client coupled to the data communication network, said method comprising:

receiving, at a network server, a plurality of keys encrypted by the first client in response to a request from a user of the first client to roam a private key, said plurality of keys including the private key, a wrapping key generated by the first client in response to an encryption password received from the user, and a recovery key generated by the first client, said private key being encrypted as a function of said wrapping key, said wrapping key and said recovery key being unknown to the server, said server being coupled to the data communication network;

generating, at the server, a backup key in response to the plurality of encrypted keys received from the first client;

storing the received plurality of encrypted keys and the generated backup key at the server;

receiving, at the server, a request from the second client for backup data; and in response to the received request, transferring the encrypted recovery key and the backup key from the server to the second client, said second client generating a backup encrypted recovery key representative of the recovery key encrypted as a function of the transferred backup key for storage on the second client.

2. The method of claim 1, further comprising decrypting the encrypted recovery key at the second client as a function of the wrapping key, said wrapping key being generated on the second client in response to the encryption password received from a user of the second client.

3. The method of claim 1, wherein said recovery key is generated on the first client in response to a recovery option selected by the user.

4. The method of claim 1, further comprising transferring the encrypted private key and the encrypted wrapping key from the server to the second client in response to a received recovery request, said backup encrypted recovery key stored on the second client being decrypted, at the second client, as a function of the transferred backup key to obtain the recovery key, said encrypted wrapping key being decrypted, at the second client, as a function of the obtained recovery key to obtain the wrapping key, and said encrypted private key being decrypted, at the second client, as a function of the obtained wrapping key to obtain the private key.

5. The method of claim 1, further comprising transferring the encrypted recovery key and the backup key to the first client in response to a backup request received from the user of the first client, said transferred encrypted recovery key being decrypted, at the first client, as a function of the wrapping key generated on the first client to obtain the recovery key, said first client encrypting the obtained recovery key as a function of the transferred backup key to generate the backup encrypted recovery key for storage in a memory associated with the first client.

6. The method of claim 5, further comprising transferring the encrypted private key and the encrypted wrapping key from the server to the first client in response to a recovery request received from the first client via the data communication network, said backup encrypted recovery key stored on the first client being decrypted, at the first client, as a function of the transferred backup key to obtain the recovery key, said encrypted wrapping key being decrypted, at the first client, as a function of the obtained recovery key, and said encrypted private key being decrypted, at the first client, as a function of the obtained wrapping key to obtain the private key.

7. The method of claim 1, further comprising:
retrieving the stored backup key from the database associated with the server in response to a recovery request received from the user of the second client; and
transferring the backup key from the server to the second client in response to the received recovery request.

8. The method of claim 1 wherein the second client is a roaming client computer coupled to the data communication network.

9. One or more computer readable storage media having computer-executable instructions for performing the method of claim 1.

10. A system for communicating private data on a data communication network, comprising:
a first client coupled to the data communication network for receiving a request from a user to roam a private key and responding to said request, said responding by the first client comprising:
generating a wrapping key as a function of an encryption password provided by the user;
generating a recovery key;
encrypting the private key as a function of the wrapping key;
encrypting the wrapping key as a function of the recovery key; and
encrypting the recovery key as a function of the wrapping key;
a server for receiving the private, wrapping, and recovery keys encrypted by the first client and in response to receiving said encrypted keys, generating a backup key, said server being coupled to the data communication network;
a database associated with the server, said server being configured to store the received encrypted keys and the generated backup key in the database and to transfer backup data in response to receiving a request for the backup data, said backup data including the stored encrypted recovery key and the stored backup key; and
a second client coupled to the data communication network for requesting the backup data from the server and generating a backup encrypted recovery key in response to receiving said backup data from the server, said generating by the second client comprising:
receiving the encryption password from the user;
decrypting the encrypted recovery key as a function of the received encryption password;
encrypting the backup key as a function the recovery key; and
storing the backup encrypted recover key in a memory associated with the second client.

11. The system of claim 10, wherein the first client is configured to store the generated recovery key on the first client.

12. The system of claim 10 wherein the backup key is randomly generated by the server in response to receiving said plurality of encrypted keys from the first client.

13. The system of claim 10 wherein the server is further configured to transfer the encrypted private key, the generated backup key, and the encrypted wrapping key to the second client computer in response to a recovery request received from the second client computer, wherein the backup encrypted recovery key stored in the memory associated with the second client computer is decrypted, at the second client, as a function of the transferred backup key to obtain the recovery key, said transferred encrypted wrapping key being decrypted, at the second client, as a function of the obtained recovery key to obtain the wrapping key, said transferred encrypted private key being decrypted, at the second client, as a function of the obtained wrapping key to obtain the private key.

14. A computer readable storage medium comprising computer-executable instructions for communicating private data between computers coupled to a data communication network, said computers including a first client and a second client coupled to the data communication network, said computer-readable medium comprising:
first receiving instructions for receiving, at a network server, a plurality of keys encrypted by the first client in response to a request from a user of the first client to roam a private key, said plurality of keys including the private key, a wrapping key generated by the first client in response to an encryption password received from the user, and a recovery key generated by the first client, said private key being encrypted as a function of said wrapping key, said wrapping key and said recovery key being unknown to the server, said server being coupled to the data communication network;
generating instructions for generating, by the server, a backup key in response to the plurality of encrypted keys received from the first client;
storing instructions for storing the received plurality of encrypted keys and the generated backup key at the server;
second receiving instructions for receiving, at the server, a request from the second client for backup data; and transferring instructions for transferring the encrypted recovery key and the backup key from the server to the second client in response to the received request, said second client generating a backup encrypted recovery key representative of the recovery key encrypted as a function of the transferred backup key.

15. The computer readable storage medium of claim 14, wherein the transferring instruction includes instruction for transferring the encrypted private key, said encrypted private key being decrypted, at the second client, as a function of the wrapping key, said wrapping key being generated on the second client responsive to the encryption password received from a user of the second client.

16. The computer readable storage medium of claim 14 wherein the first receiving instructions further include instructions for receiving, at the server, the wrapping key encrypted by the first client as a function of a recovery key unknown to the server, said recovery key being generated on the first client in response to a recovery option selected by the user via the first client, and receiving, at the server, the recovery key encrypted by the first client as a function of the wrapping key.

17. A method of communicating private data between computers coupled to a data communication network, said computers including a first client and a second client coupled to the data communication network, said method comprising:
  receiving, at a server, a request from a roaming client for backup data, said request including a digest or hashed value of an authentication password, said server being coupled to the data communication network;
  determining if a form of the authentication password received from the roaming client is valid;
  retrieving, when a form of the authentication password is valid, the backup data, said backup data including a back up key and an encrypted recovery key, said recovery key encrypted as a function of a wrapping key, said wrapping key being previously generated as a function of an encryption password; and
  transferring the retrieved encrypted backup data from the server to the roaming client for generating a backup encrypted recovery key.

18. The method of claim 17, further comprising decrypting the transferred encrypted recovery key at the roaming client as a function of the wrapping key, said wrapping key being generated on the roaming client in response to the encryption password received from a user of the roaming client.

19. The method of claim 17, further comprising:
  storing, on the roaming client, the backup encrypted recovery key representative of the recovery key encrypted as a function of the transferred backup key.

20. The method of claim 17, further comprising:
  retrieving the stored backup key in response to a recovery request received from the user of the roaming client, said backup key generated at the server in response to receiving an encrypted private key from the home client;
  transferring the backup key from the server to the roaming client via the data communication network in a secure manner in response to the received recovery request, said roaming client decrypting the backup encrypted recovery key to obtain the recovery key.

21. The method of claim 20, further comprising transferring the encrypted private key and the encrypted wrapping key from the server to the roaming client in response to the received recovery request, said encrypted wrapping key being decrypted, at the roaming client, as a function of the obtained recovery key to obtain the wrapping key, and said encrypted private key being decrypted, at the roaming client, as a function of the obtained wrapping key to obtain the private key.

* * * * *